C. F. BROWN.
APPARATUS FOR INTENSIVE FEEDING OF POULTRY.
APPLICATION FILED MAR. 14, 1919.

1,335,155.

Patented Mar. 30, 1920.
2 SHEETS—SHEET 1.

Inventor
Charles F. Brown
By Rich & Manning
Attorney

C. F. BROWN.
APPARATUS FOR INTENSIVE FEEDING OF POULTRY.
APPLICATION FILED MAR. 14, 1919.

1,335,155.

Patented Mar. 30, 1920.
2 SHEETS—SHEET 2.

Inventor
Charles F. Brown
By Rich & Manning
Attorney

UNITED STATES PATENT OFFICE.

CHARLES F. BROWN, OF SOUTH RIDGE, KANSAS.

APPARATUS FOR INTENSIVE FEEDING OF POULTRY.

1,335,155.  Specification of Letters Patent.  Patented Mar. 30, 1920.

Application filed March 14, 1919. Serial No. 282,678.

*To all whom it may concern:*

Be it known that I, CHARLES F. BROWN, a citizen of the United States of America, residing at South Ridge, in the county of Johnson and State of Kansas, have invented a certain new and Improved Apparatus for Intensive Feeding of Poultry; and I do hereby declare that the following is a full, clear, and exact description of the invention, reference being had to the accompanying drawings, forming a part of this specification.

The feeding of poultry methodically, which is the object of the present invention, consists in supplying a magazine with a complete assortment of egg producing and forming elements, and the elements producing assimilation of the feed and aiding digestion in the digestive organs of the fowl, and arranging the magazine within the reach of the fowls in a confined area for temporary periods of time, so that the amount and kind of feed most adapted to the wants of the fowl, as well as the various other substances, will be selected by the fowl in the natural egg development.

The apparatus best designed for the purpose consists of the knockdown receptacle or magazine shown in the accompanying drawings, to which reference is made, in which, Figure 1 is a perspective view of the magazine, showing the hoppers for the graded elements and the feed receptacles into which a divisional amount of the feed is delivered.

Similar numerals of reference indicate corresponding parts in all the figures of the drawings:—

Figure 1:
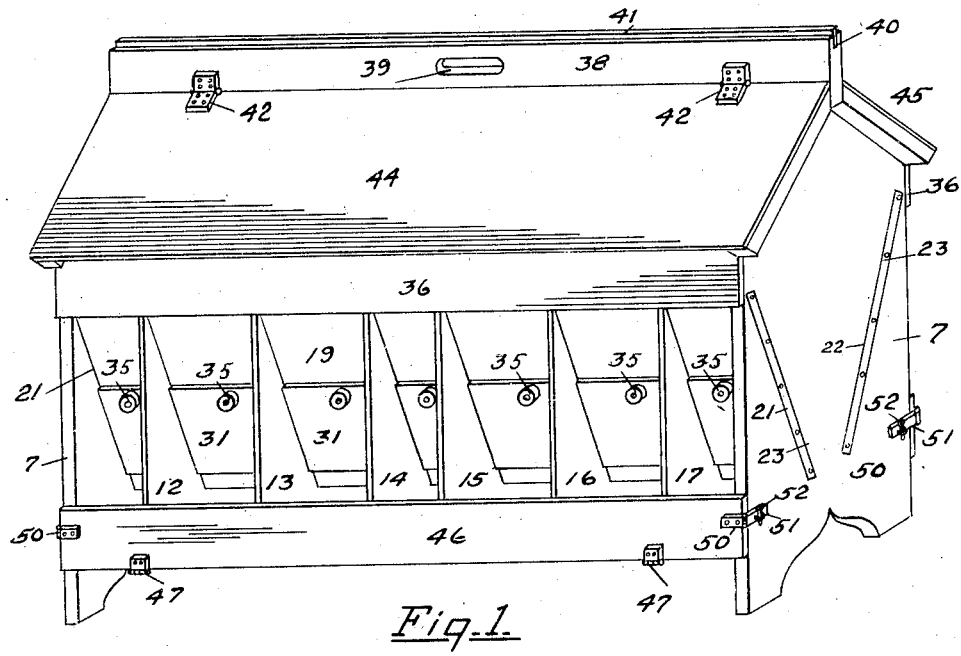
Figure 2:
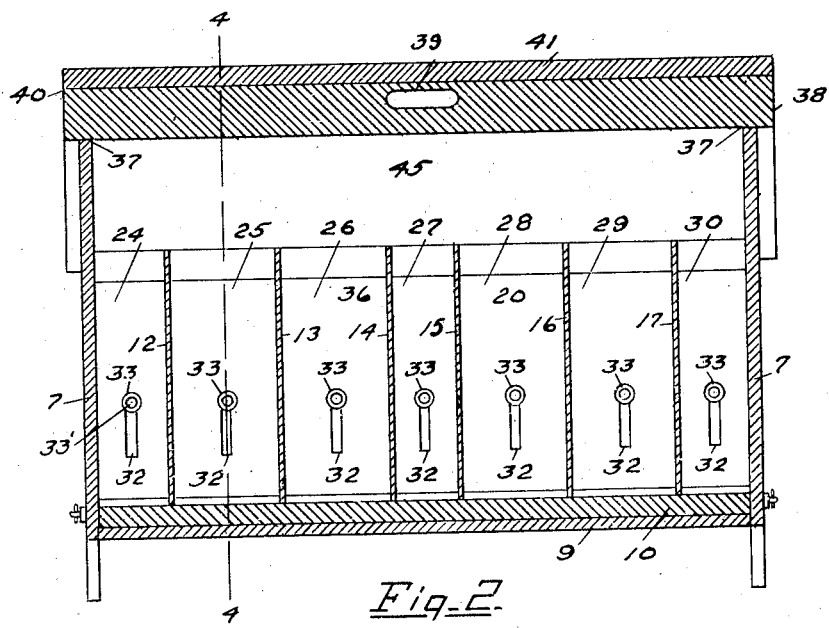
Fig. 2 is a longitudinal vertical sectional view of the magazine as seen in Fig. 1.
Figure 3:
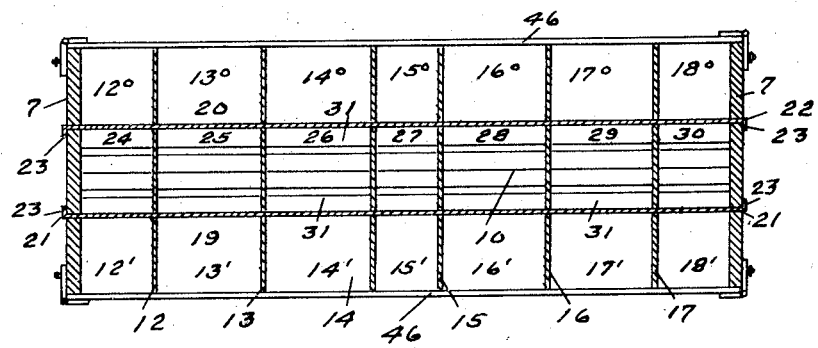
Fig. 3 is a horizontal sectional view taken on the line 3—3 on Fig. 4, showing the feeding receptacles on both sides of the magazine.
Figure 4:
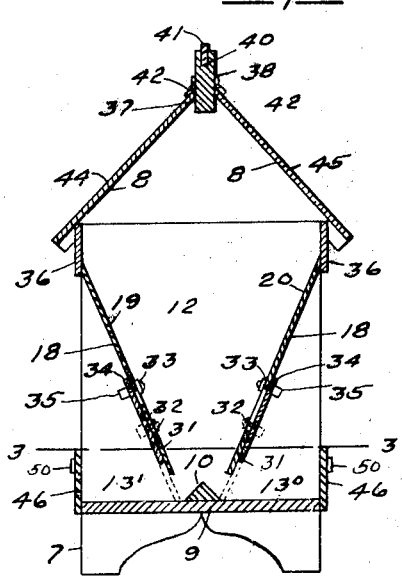
Fig. 4 is a vertical transverse sectional view of the magazine taken on the line 4—4 on Fig. 2.

The receptacle or magazine, as shown, is made from any suitable material and of the length, width and height of such dimensions as to be portable and which with the feed contained therein may be carried by the hand from place to place. The parts of the magazine consist of the vertical end members or plates 7—7 of the proper width, the upper ends of each plate being inclined outwardly and downwardly in reverse directions from the vertical central portion of the plate, as at 8—8, see Fig. 4. The bottom plate or member 9, extends the full width of the end plates 7—7 and is connected at its ends with the respective inner surfaces of the end plates 7—7 a short distance upwardly from their lower ends. A feed dividing block 10 is secured to the upper surface of the bottom plate 9 at a point equidistant from its longitudinal outer surfaces and extends the length of said bottom plate, the block being triangular in cross section. The magazine is provided with a number of upright partitions, 12—13—14—15—16 and 17, extending in a transverse direction to the magazine and spaced at unequal distances apart as further described, these partitions extending upwardly to a line horizontal with the lower inclined portions 8—8 of the respective end members of the magazine. Extending in the longitudinal direction of the magazine, and through the downwardly and inwardly inclined openings 18 in each partition, are the separate plates 19 and 20 respectively, the outer ends of which plates extend through the downwardly and inwardly inclined openings 21 and 22, respectively, in the respective ends 7—7 of the magazine, and are upset or bent at 23 at right angles upon the outer surfaces of said end members whereby the assembled parts of the magazine through which the separate plates 19 and 20 extend are held together in a knockdown condition.

The plates 19 and 20 form, with the respective partitions 12—13—14—15—16 and 17 and the end members 7—7 of the magazine, the outer members of a series of independent hoppers 24, 25, 26, 27, 28, 29 and 30, for the feed and other substances, the upper ends of each plate 19 and 20, extending from a position near the upper ends and outer edge portion of the respective partitions downwardly and inwardly toward the inclined surfaces of the feed dividing block 10, on the bottom member 9 of the magazine and to a position a short distance above said surfaces.

For the feed regulation which is essential to the number of fowls inclosed within a coop, and to insure proportions to each fowl which will be sufficient to the needs of each fowl in the feeding period, an adjustable plate or valve 31 is arranged between the respective partitions and the respective ends 7—7 of the magazine and adjacent partitions and upon the outer surfaces of said longitudinal plates 19 and 20. In said plates 19 and 20, in the direction of their lower ends, are vertical slots 32. A screw-threaded plate adjusting bolt within each hopper, extends through the slot 32 of the plates 19 and 20 and through an opening 34 in the upper end of each adjusting plate, and upon the outer ends of said bolts are nuts 35, which bear upon the outer surface of said adjustable plates 31. Upon releasing the nuts 35, the plates 31 are moved downwardly toward the inclined surfaces of the feed dividing block 10, as seen in dotted lines in Fig. 4, and may close the space between any plate and the block 10, or permit the regulation of the feed so as to pass over the block, and in this manner distribute the feed upon the bottom member 9 upon both sides of the block in the proper proportions.

Face blocks 36 are removably secured at their ends to the respective outer surfaces of the end members 7—7 of the magazine, their upper surfaces being upon a line horizontally with the upper ends of the respective partitions 12—13—14—15—16 and 17, their lower edges being opposite the upper portions of the longitudinal plates 19 and 20.

In the upper portions of the end plates or members 7—7, and the apex of the inclined surfaces, are transverse grooves 37, in which is removably secured the respective ends of a longitudinal rail or ridge bar 38, the ends of which bar extend short distances beyond the lines of the outer surfaces of said end members 7—7. In this ridge bar, is an oblong opening 39, for the hand of the person, and by means of which the magazine is carried to and removed from the inclosure. In the upper surface of the ridge bar 38, is a longitudinal groove 40, in which groove is secured fixedly a longitudinal thin plate 41, which extends upwardly a short distance above the upper surface of the bar.

To the reverse side of the bar 38, are hinged at 42—42 the upper longitudinal portions of the respective covers 44, and 45, the lower portions extending short distances beyond the upper longitudinal surfaces of the face plates 36.

Longitudinal plates 46 extend from the outer surfaces of one end plate 7 to the outer surfaces of the other end plate 7, on both sides of the magazine, and upward a short distance from the lines of the respective longitudinal outer surfaces of the bottom plate 9, and from the outer vertical sides to the troughs which close the entrance to the feed receptacle and retain the food delivered from the hoppers upon the bottom plate 9 from being scattered and also forms, with said bottom members, the receptacles 12'—13'—14'—15'—16'—17' and 18' upon one side of the magazine, and 12°—13°—14° 15°—16°—17°— and 18° on the other side of the magazine for feeding purposes and to which the feed is delivered from the receptacle hoppers 24, 25, 26, 27, 28, 29 and 30, in the proper regulated quantities.

In order to open the receptacles at any time for cleaning or other purposes, these face plates 46 are hinged at 47 to said bottom plate 9, and a hasp 50 hinged to each end of each of the face plates 46, and extend around the outer edges of the end plates 7—7 and secured to the staples 51 by a cotter pin 52.

Figure 5:
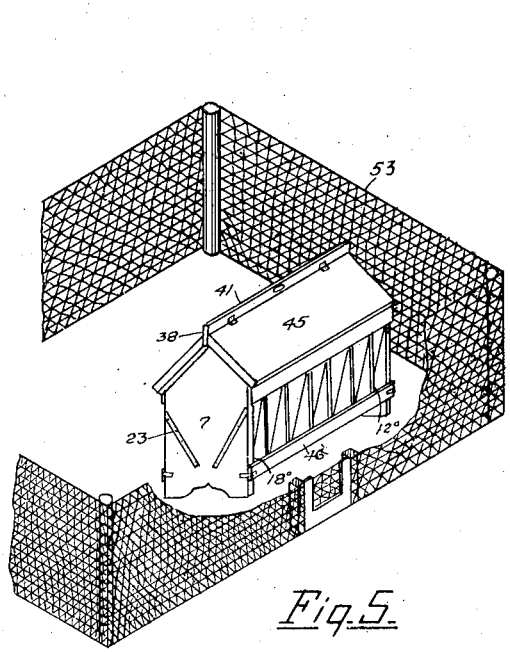
Fig. 5 is a view in perspective of an inclosure or coop for the poultry showing the system of feeding periodically therein, the magazine being arranged within the coop so that the feeding is facilitated on both sides of the magazine.

For intensive poultry feeding, the poultry are confined within an inclosure or coop 53, as seen in Fig. 5, and preferably without a chanticleer. The covers 44 and 45 are raised and the hoppers 24—25—26—27—28—29 and 30 are supplied with the feed in the kind and quantity adapted for the purpose and in general may consist of a regular diet such as wheat, oats and barley, Kafir corn, which are supplied to the hoppers 25—26—28 and 29 respectively, the hoppers 24, 27 and 30, being supplied with meat, charcoal and ground oyster shells respectively, these hoppers 24—27 and 30 being smaller than the others for the reason that the fowl requires but a small amount of each substance. The covers are then closed. It is apparent that the movement of the feed will vary in the hoppers, the wheat passing more rapidly to the feed receptacles, hence the adjusting plates 31 in each feed receptacle are raised to permit the gradual supply of each kind of the enumerated dietic food substances and the egg producing substances, in a manner relative to gravitation and passage from the respective hoppers to the feed receptacles, the feed supply being proportional to the amount consumed by the fowls. Following this adjustment of the plates, the varieties of feed and other substances flow downward from the respective hoppers upon both sides of the dividing block 10 into the respective feed receptacles 12', 12°, 13', 13°, 14', 14°, 15', 15°, 16', 16°, 17', 17°, and 18', 18°. The covers 44 and 45 are then closed, and the magazine raised by the hand and introduced within the inclosure of the coop 53 in such a position that the fowls may pass around the magazine and select the food required and such other substances for egg development as is found in the magazine. When the fowls have had an opportunity to obtain sufficient feed, the magazine is taken from the coop and if need be, replenished and at the proper feeding time again placed in the coop for the next feeding, and so continued at the regular times for poultry feeding. By this method, the fowls select the feed most desirable and ambulate, without crowding, circuitously in the vicinity of the magazine, each fowl obtaining its due proportion of the feed, and this, in kind, is modified and increased to the determination of the greatest egg production. The feed is sheltered during a fall of rain by the covers 44 and 45. The thin plate 41, in the ridge bar 38, serves to make difficult the roosting of the fowls on the ridge bar and soiling the magazine—no grasp of the ridge bar being possible by the feet of the fowl, and should it be attempted the sharp edge of the plate 41 will serve to prevent it.

I am aware that hoppers for poultry feeders have been constructed extending the length of the trough with lateral partitions within or abutting the outer sides of the trough, all of which require to be braced. In my construction, when the parts of the magazine are assembled, the plates forming the hoppers support the partitions without the necessity of employing braces, nails or screws, and when the plates are removed the end members of the magazine, the trough, and partitions are in a knockdown condition.

Having fully described my invention, what I now claim as new and desire to secure by Letters Patent is, In a poultry feeder, a knockdown structure comprising end members and transverse partitions provided with corresponding downwardly and inwardly inclined openings and plates extending through said openings in said partitions, and said end members, and upset on the outer sides of said end members and forming individual troughs between said partitions.

CHARLES F. BROWN.

Witnesses:
MARGUERITE BROWDER,
D. T. SNYDER.